(12) United States Patent
Kim

(10) Patent No.: US 12,494,554 B2
(45) Date of Patent: Dec. 9, 2025

(54) BATTERY MODULE HAVING FLEXIBLE BUSBAR

(71) Applicant: SAMSUNG SDI CO., LTD., Yongin-si (KR)

(72) Inventor: Young Deok Kim, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 24 days.

(21) Appl. No.: 17/675,148

(22) Filed: Feb. 18, 2022

(65) Prior Publication Data

US 2022/0344784 A1 Oct. 27, 2022

(30) Foreign Application Priority Data

Apr. 21, 2021 (KR) .................. 10-2021-0051646

(51) Int. Cl.
*H01M 50/522* (2021.01)
*H01M 50/503* (2021.01)
*H01M 50/507* (2021.01)
*H01M 50/514* (2021.01)

(52) U.S. Cl.
CPC ....... *H01M 50/522* (2021.01); *H01M 50/503* (2021.01); *H01M 50/507* (2021.01); *H01M 50/514* (2021.01)

(58) Field of Classification Search
None
See application file for complete search history.

(56) References Cited

U.S. PATENT DOCUMENTS

| | | |
|---|---|---|
| 10,115,954 B2 | 10/2018 | Lee |
| 10,700,335 B2 | 6/2020 | Mastrandrea et al. |
| 11,239,533 B2 | 2/2022 | Zeng et al. |
| 11,673,205 B2 | 6/2023 | Lee et al. |
| 2015/0162578 A1* | 6/2015 | Kim |
| 2015/0171405 A1 | 6/2015 | Lee |
| 2018/0069225 A1* | 3/2018 | Mastrandrea ....... H01M 50/289 |
| 2019/0027731 A1 | 1/2019 | Zeng et al. |
| 2020/0136118 A1 | 4/2020 | Weinberger et al. |
| 2020/0144579 A1* | 5/2020 | Narayanan .............. B60L 53/14 |
| 2020/0395590 A1 | 12/2020 | Yasuda et al. |

(Continued)

FOREIGN PATENT DOCUMENTS

| | | |
|---|---|---|
| CN | 107591505 A | 1/2018 |
| CN | 208444901 U | 1/2019 |

(Continued)

OTHER PUBLICATIONS

Extended European Search Report dated Jan. 25, 2023.
(Continued)

*Primary Examiner* — Matthew T Martin
*Assistant Examiner* — Krishna R Hammond
(74) *Attorney, Agent, or Firm* — Lee IP Law, P.C.

(57) ABSTRACT

A battery module including a plurality of battery cells arranged in a line; and a busbar electrically connecting the multiple battery cells, wherein the busbar includes a large current busbar having a central region and a peripheral region, a stepped busbar electrically connecting the central region of the large current busbar and the plurality of battery cells, and a wave busbar electrically connecting the peripheral region of the large current busbar and the plurality of battery cells.

18 Claims, 3 Drawing Sheets

(56) References Cited

U.S. PATENT DOCUMENTS

| | | |
|---|---|---|
| 2021/0036296 A1 | 2/2021 | Nobuhira et al. |
| 2021/0074966 A1 | 3/2021 | Shan et al. |
| 2021/0167467 A1 | 6/2021 | Yang et al. |

FOREIGN PATENT DOCUMENTS

| | | | | |
|---|---|---|---|---|
| CN | 110931696 A | | 3/2020 | |
| CN | 111137141 A | | 5/2020 | |
| CN | 111247662 A | | 6/2020 | |
| CN | 112103460 A | | 12/2020 | |
| EP | 3506383 A1 | * | 7/2019 | ........ H01M 10/6553 |
| EP | 3644408 A1 | | 4/2020 | |
| EP | 3754753 A1 | * | 12/2020 | ........ H01M 10/4207 |
| EP | 3796446 A1 | | 3/2021 | |
| KR | 10-1720618 B1 | | 3/2017 | |
| KR | 10-2018-0039526 A | | 4/2018 | |
| KR | 10-2020-0034469 A | | 3/2020 | |
| KR | 10-2135607 B1 | | 7/2020 | |

OTHER PUBLICATIONS

Chinese Office Action dated Dec. 25, 2023, of the Chinese Patent Application No. 202210286817.4.
Korean Office Action dated Sep. 9, 2025, for corresponding Korean Patent Application No. 10-2021-0051646.

\* cited by examiner

BATTERY MODULE HAVING FLEXIBLE BUSBAR

CROSS-REFERENCE TO RELATED APPLICATION

This application claims priority to and the benefit of Korean Patent Application No. 10-2021-0051646 filed on Apr. 21, 2021 in the Korean Intellectual Property Office, the contents of which in its entirety are herein incorporated by reference.

BACKGROUND

1. Field

Embodiments relate to a battery module having a flexible busbar.

2. Description of the Related Art

A secondary battery is a power storage system that provides excellent energy density for storing electrical energy in the form of chemical energy. Compared to non-rechargeable primary batteries, secondary batteries are rechargeable and may be used in IT devices such as smartphones, cellular phones, laptops, and tablet PCs. Recently, interest in electric vehicles has increased to help reduce or prevent environmental pollution, and thus, high-capacity secondary batteries are being adopted for electric vehicles. Such secondary batteries may have characteristics such as high density, high output, and stability.

The above information disclosed in this Background section is only for enhancement of understanding of the background of the invention and therefore it may contain information that does not constitute prior art.

SUMMARY

The embodiments may be realized by providing a battery module including a plurality of battery cells arranged in a line; and a busbar electrically connecting the plurality of battery cells, wherein the busbar includes a large current busbar having a central region and a peripheral region, a stepped busbar electrically connecting the central region of the large current busbar and the plurality of battery cells, and a wave busbar electrically connecting the peripheral region of the large current busbar and the plurality of battery cells.

A thickness of the large current busbar may be greater than a thickness of the stepped busbar, and the thickness of the large current busbar may be greater than a thickness of the wave busbar.

The large current busbar may include a rectangular plate-shaped body, and a protrusion that protrudes outwardly from a central region of the body.

The large current busbar may include copper or aluminum, and the stepped busbar or the wave busbar may include aluminum.

The stepped busbar may include a body region that is welded to the central region of the large current busbar, at least one leg region that extends from the body region and is welded to a battery cell of the plurality of battery cells, and a first inclined region that is downwardly inclined between the body region and the at least one leg region.

A height of the first inclined region may be equal to a thickness of the large current busbar.

The at least one leg region may include a pair of leg regions that respectively extend from opposite ends of the body region.

The wave busbar may include an inner body region that is welded to the peripheral region of the large current busbar; a first leg region that extends from the inner body region and is welded to one battery cell of the plurality of battery cells; a first inclined region that is downwardly inclined between the inner body region and the first leg region; an outer body region on an outer side of the inner body region; a bending region that connects the inner body region and the outer body region; a second leg region that is welded to another battery cell of the plurality of battery cells; and a second inclined region that is downwardly inclined between the outer body region and the second leg region.

A height of the bending region may be 2 to 5 times a thickness of the bending region.

A height of the bending region may be greater than a thickness of the large current busbar.

The bending region may have a cross-sectional shape in which a corner round part is applied to a right angle shape or a corner round part is applied to a trapezoid shape.

A height of the second inclined region may be equal to a thickness of the large current busbar.

BRIEF DESCRIPTION OF DRAWINGS

Features will be apparent to those of skill in the art by describing in detail exemplary embodiments with reference to the attached drawings in which.

DETAILED DESCRIPTION

Figure 1:
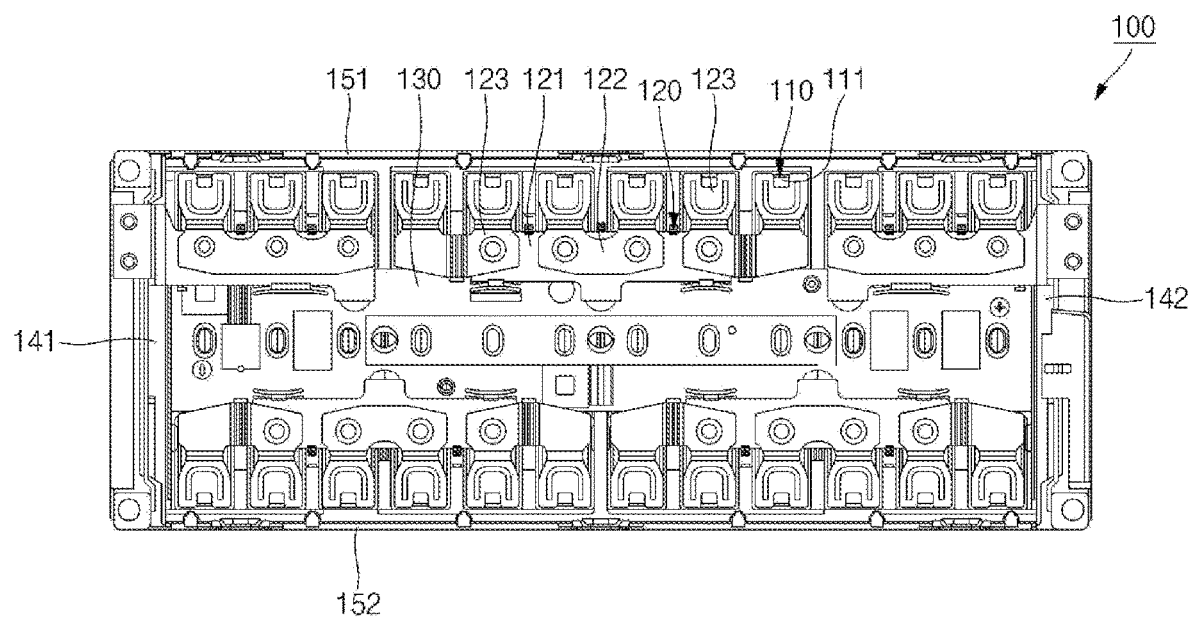
FIG. 1 is a plan view of an exemplary battery module according to the present disclosure.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or element, it can be directly on the other layer or element, or intervening layers may also be present. In addition, it will also be understood that when a layer is referred to as being "between" two layers, it can be the only layer between the two layers, or one or more intervening layers may also be present. Like reference numerals refer to like elements throughout.

As used herein, the terms "or" and "and/or" include any and all combinations of one or more of the associated listed items, e.g., "A or B" would include A, B, or A and B. In addition, it will be understood that when an element A is referred to as being "connected to" an element B, the element A can be directly connected to the element B or an intervening element C may be present therebetween such that the element A and the element B are indirectly connected to each other.

The terminology used herein is for the purpose of describing particular embodiments only and is not intended to be limiting of the disclosure. As used herein, the singular forms are intended to include the plural forms as well, unless the context clearly indicates otherwise. It will be further understood that the terms that the terms comprise or include and/or comprising or including, when used in this specification, specify the presence of stated features, numbers, steps, operations, elements, and/or components, but do not preclude the presence or addition of one or more other features, numbers, steps, operations, elements, components, and/or groups thereof.

It will be understood that, although the terms first, second, etc. may be used herein to describe various members, elements, regions, layers and/or sections, these members, elements, regions, layers and/or sections should not be limited by these terms. These terms are only used to distinguish one member, element, region, layer and/or section from another, e.g., and are not intended to imply or require sequential inclusion. Thus, for example, a first member, a first element, a first region, a first layer and/or a first section discussed below could be termed a second member, a second element, a second region, a second layer and/or a second section without departing from the teachings of the present disclosure.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the element or feature in the figures is turned over, elements described as "below" or "beneath" other elements or features would then be oriented "on" or "above" the other elements or features. Thus, the exemplary term "below" can encompass both an orientation of above and below.

Figure 2:
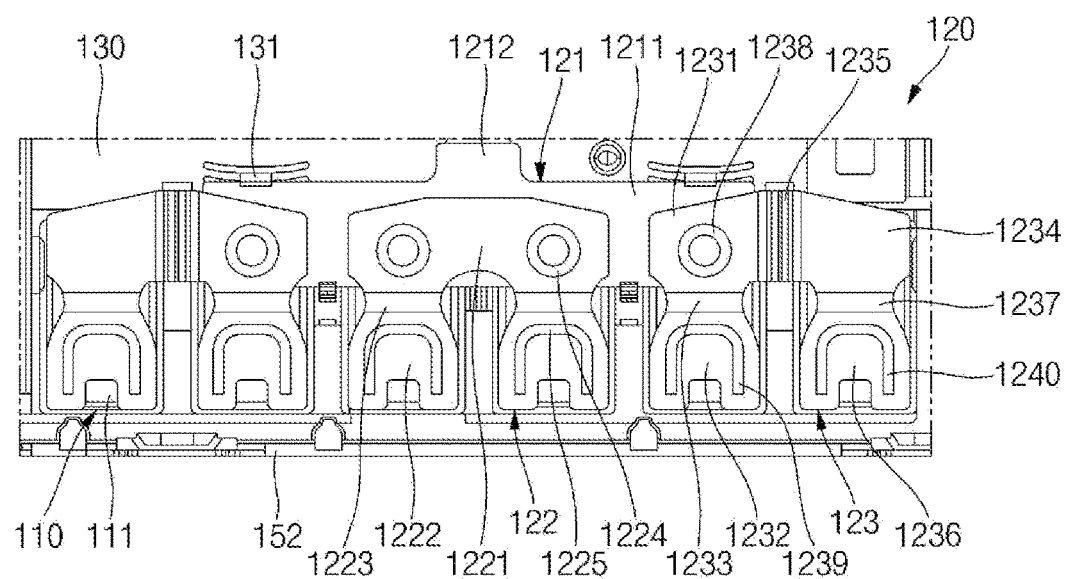
FIG. 2 is a partially enlarged view of an exemplary battery module according to the present disclosure.
Figure 3A:
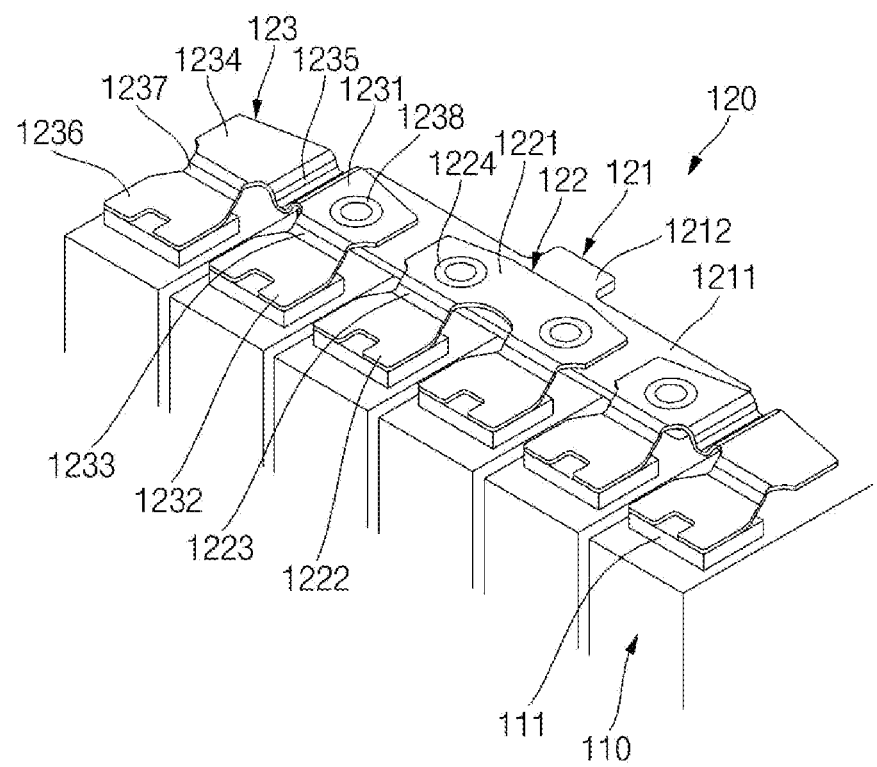
FIGS. 3A and 3B are a perspective view and a front view of an exemplary flexible busbar according to the present disclosure.
Figure 3B:
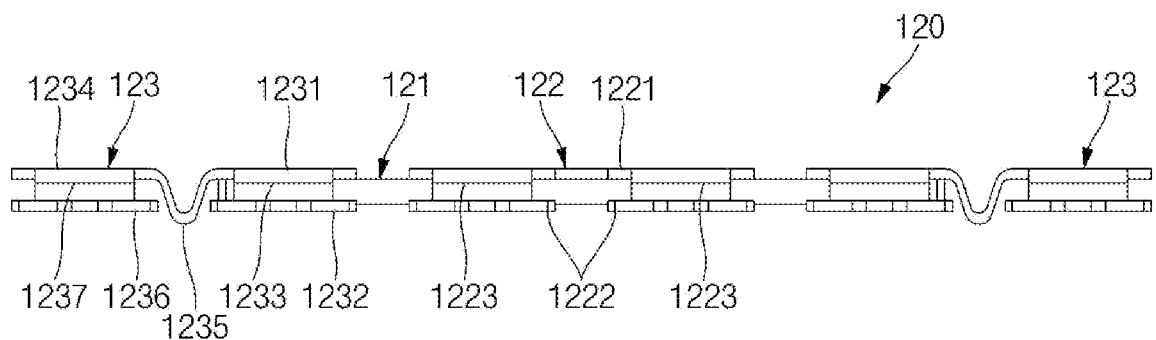

FIG. 1 is a plan view of an exemplary battery module 100 according to the present disclosure, FIG. 2 is a partially enlarged view of an exemplary battery module 100 according to the present disclosure, and FIGS. 3A and 3B are a perspective view and a front view of an exemplary flexible busbar 120 according to the present disclosure.

As illustrated in FIGS. 1, 2, 3A and 3B, the battery module 100 according to an embodiment may include a plurality of battery cells 110, and a plurality of busbars 120 electrically connecting the plurality of battery cells 110.

In an implementation, a substantially plate-shaped insulating holder 130 may be between the battery cell 110 and the busbar 120. In an implementation, end plates 141 and 142 may be at opposite ends of the battery module 100 in a longitudinal direction (e.g., in a first direction), and side plates 151 and 152 may be at opposite ends of the battery module 100 in a width direction. In an implementation, output terminals may be connected to the last or outer opposite ends of the busbar 120, or another battery module may be connected thereto. In an implementation, the busbar 120 may be electrically connected to a battery monitoring system board. In an implementation, a voltage sensor or a current sensor may be connected to the busbar 120, which may be electrically connected to the battery monitoring system board.

The battery cell 110 may include a rechargeable secondary battery. In an implementation, the battery cell 110 may be a prismatic cell, a pouch-type cell, or a cylindrical cell. In an implementation, the battery cell 110 may include a positive electrode terminal or a negative electrode terminal. Hereinafter, the positive electrode terminal and the negative electrode terminal are simply referred to as a terminal 111.

In an implementation, the plurality of battery cells 110 may be arranged in a line in the first direction, and accordingly, the plurality of terminals 111 may also be arranged in a line in the first direction.

The busbar 120 may electrically connect the plurality of battery cells 110. In an implementation, the busbar 120 may connect a plurality of battery cells 110 in parallel or connect a plurality of battery cells 110 in series.

The busbar 120 may include, e.g., a large current busbar 121, a stepped busbar 122, and a wave busbar 123. For example, the busbar 120 may be a multi-piece busbar including separate pieces coupled together.

In an implementation, the large current busbar 121 may include a rectangular plate-shaped body 1211 and a protrusion 1212 that protrudes outwardly from a central region of the body 1211. In an implementation, the length direction of the large current busbar 121 may be defined as a first direction, and the width direction thereof may be defined as a second direction. In an implementation, the protrusion 1212 may protrude in the second direction from the central region. In an implementation, a width of the central region of the large current busbar 121 where the current is concentrated may be relatively wide, and thus heat may be rapidly dissipated. In an implementation, by providing the protrusion 1212, a voltage sensor may be connected to the protrusion 1212, thereby facilitating installation of the voltage sensor. In an implementation, the large current busbar 121 may include, e.g., copper, a copper alloy, aluminum, or an aluminum alloy. In an implementation, a thickness of the large current busbar 121 (e.g., in a vertical direction orthogonal to the first and second directions) may range from approximately 1 mm (millimeters) to approximately 10 mm. The large current busbar 121 may allow current to flow from the stepped busbar 122 and the wave busbar 123 in a concentrated manner, or may allow current to flow to the stepped busbar 122 and the wave busbar 123 in a divided manner. Accordingly, a relatively large current may flow through the large current busbar 121 compared to the stepped busbar 122 and the wave busbar 123. In an implementation, the large current busbar 121 may be coupled to and fixed to a latching protrusion 131 in the insulation holder 130 on the battery cell 110. In an implementation, the large current busbar 121 may also be referred to as a first busbar for convenience.

The stepped busbar 122 may electrically connect the central region of the large current busbar 121 and the plurality of battery cells 110. In an implementation, the stepped busbar 122 may include a body region 1221, a (e.g., at least one) leg region 1222, and an inclined region 1223.

The body region 1221 may extend (e.g., lengthwise) substantially in the first direction. The body region 1221 may be laser or ultrasonically welded to the central region of the large current busbar 121. Accordingly, a welding region 1224 may be between the body region 1221 of the stepped busbar 122 and the central region of the large current busbar 121. In an implementation, approximately two welding regions 1224 may be provided, and may be provided in an approximately circular or ring shape.

The leg region 1222 may extend from opposite ends of the body region 1221 to be connected to the battery cells 110. In an implementation, the leg region 1222 may be laser or ultrasonically welded to the terminal 111 of the battery cell 110. Accordingly, a welding region 1225 may be between the leg region 1222 of the stepped busbar 122 and the terminal 111 of the battery cell 110. In an implementation, the welding region 1225 may have a substantially horseshoe shape (∩). In an implementation, the leg region 1222 may extend from the body region 1221 in the second direction (perpendicular to the first direction). In an implementation, the leg region 1222 may include a pair of leg regions extending from (e.g., opposite) ends of the body region 1221. In an implementation, by the stepped busbar 122, the two battery cells 110 may be connected in series or in parallel.

The inclined region 1223 may have a downwardly inclined shape between the body region 1221 and the leg region 1222. In an implementation, a height of the inclined region 1223 (e.g., in the vertical direction) may be substantially equal to the thickness of the large current busbar 121. In an implementation, the inclined region 1223 may be bent at least 1 to 5 times.

In an implementation, the stepped busbar 122 may include, e.g., copper, a copper alloy, aluminum, or an aluminum alloy. In an implementation, the thickness of the stepped busbar 122 (e.g., in the vertical direction) may range from approximately 0.1 mm to approximately 2 mm. In an implementation, the stepped busbar 122 may also be referred to as a second busbar for convenience.

The wave busbar 123 may include an inner body region 1231, a first leg region 1232, a first inclined region 1233, an outer body region 1234, a bending region 1235, a second leg region 1236, and a second inclined region 1237. In an implementation, a pair of the wave busbars 123 may be at opposite ends of the large current busbar 121, respectively.

The inner body region 1231 may be laser or ultrasonically welded to the peripheral region of the large current busbar 121. Accordingly, a welding region 1238 may be between the inner body region 1231 of the wave busbar 123 and the peripheral region of the large current busbar 121. In an implementation, the welding region 1238 may be provided in a roughly circular or ring shape.

The first leg region 1232 may extend from the inner body region 1231 and be welded to the battery cell 110. In an implementation, the first leg region 1232 may extend from the inner body region 1231 in the second direction and may be laser or ultrasonically welded to the terminal 111 of the battery cell 110. Accordingly, a welding region 1239 may be between the first leg region 1232 of the wave busbar 123 and the terminal 111 of the battery cell 110. In an implementation, the welding region 1239 may have, e.g., a substantially horseshoe shape (∩).

The first inclined region 1233 may be inclined downwardly between the inner body region 1231 and the first leg region 1232. In an implementation, a height of the first inclined region 1233 may be equal or similar to the thickness of the large current busbar 121.

The outer body region 1234 may extend from the inner body region 1231. In an implementation, the outer body region 1234 may extend outwardly from the inner body region 1231 in the first direction (perpendicular to the second direction).

Figure 4A:
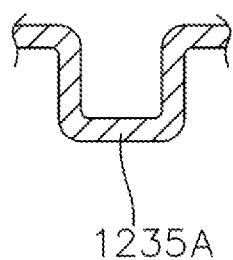
FIGS. 4A and 4B are cross sectional views of an exemplary bending region of the flexible busbar according to the present disclosure.
Figure 4B:
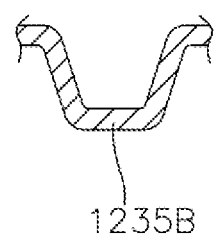

The bending region 1235 may connect the inner body region 1231 and the outer body region 1234. In an implementation, the height of the bending region 1235 (e.g., a distance from an apex of the bending region 1235 to a region where the bending region connects to the inner body region 1231 or the outer body region 1234 in the vertical direction) may be about 2 to about 5 times the thickness of the bending region 1235 (e.g., in the vertical direction). In an implementation, the height of the bending region 1235 may be greater than the thickness of the large current busbar 121 (e.g., in the vertical direction). In an implementation, the bending region 1235 may be bent 2 to 5 times (e.g., between the inner body region 1231 and the outer body region 1234). In an implementation, the bending region 1235 may be bent in a wave shape. In an implementation, the bending region 1235 may be bent in a roughly ∪ shape. In an implementation, the bending region 1235 may have a cross-sectional shape or a lateral shape in which a corner round part or a corner chamfer part is applied to a right angle shape (refer to a bending region 1235A of FIG. 4A) or a corner round part or a corner chamfer part is applied to a trapezoid shape (refer to a bending region 1235B of FIG. 4B).

A battery module 100 may swell as charging and discharging are repeated. The position of the terminal 111 of the battery cell 110 could be changed, and, accordingly, stress could be applied to the busbar 120 connected to the terminal 111 of the battery cell 110, and the busbar 120 could be displaced or deformed. A relatively large stress could be applied to a portion of the busbar 120 at an outermost portion of the battery module 100, and the busbar 120 could be damaged. According to an embodiment, by providing the wave busbar 123, displacement or deformation of the busbar may be prevented, even when the battery module 100 swells. Moreover, by providing a roughly ∪ shaped bending region 1235 to the wave busbar 123, the stress applied to the busbar 120 may be absorbed, and accordingly, displacement and deformation of the busbar may be prevented.

The second leg region 1236 may extend from the outer body region 1234 to be connected to the battery cell 110. In an implementation, the second leg region 1236 may extend in the second direction from the outer body region 1234 to be laser or ultrasonically welded to the terminal 111 of the battery cell 110. Accordingly, a welding region 1240 may be between the second leg region 1236 of the wave busbar 123 and the terminal 111 of the battery cell 110. In an implementation, the welding region 1240 may have a horseshoe or a roughly circular or ring shape.

The second inclined region 1237 may be inclined downwardly between the outer body region 1234 and the second leg region 1236. In an implementation, the height of the second inclined region 1237 may be equal or similar to the thickness of the large current busbar 121.

In an implementation, the wave busbar 123 may include, e.g., copper, a copper alloy, aluminum, or an aluminum alloy. In an implementation, the thickness of the wave busbar 123 may range from approximately 0.1 mm (millimeters) to approximately 2 mm. In some examples, wave busbar 123 may also be referred to as a third busbar for convenience.

The battery module 100 according to an embodiment may include a highly flexible busbar 120, and a plurality of battery cells 110 may be connected in series or in parallel. In an implementation, the flexible busbar 120 may not be damaged before the EOL (End Of Life) of the battery module 100 is reached. In an implementation, the flexible busbar 120 may help efficiently dissipate heat due to a large area. In an implementation, when an impact is applied to the battery module 100 in the flexible busbar 120, the damage may be minimized. In an implementation, the flexible busbar 120 may include the wave busbar 123, and if an impact were to be applied along the first direction of the battery module 100, a short circuit caused by contact between the busbars 120 may be prevented. In an implementation, according to deformation of the wave busbar 123, the wave busbar 123 may not contact another opposite or adjacent busbar 120. In an implementation, the flexible busbar 120 may provide a structure of high-capacity busbar 120 having a low height. Accordingly, a ratio of the space used by the battery cell 110 may be increased.

One or more embodiments may provide a battery module having a flexible busbar, and having a high-capacity and high-heat-dissipation flexible busbar which allows a large current to flow so as to be applied to a high-capacity battery cell, has excellent heat dissipation performance, and is not broken or damaged even when the battery cell swells.

A battery module according to an embodiment may provide a flexible busbar that is not broken, displaced, or deformed when the battery cell swells or expands or when receives an impact from the outside.

A battery module according to an embodiment may provide a flexible busbar in which little heat is generated even when a large current flows.

A battery module according to an embodiment may provide a flexible busbar in which little heat is generated even when a large current flows and a voltage sensor or the like is easily installed.

A battery module according to an embodiment may provide a flexible busbar having small electric resistance.

A battery module according to an embodiment may provide a flexible busbar that is easily welded to the battery cells.

A battery module according to an embodiment may provide a flexible busbar that has a small thickness.

A battery module according to an embodiment may provide a flexible busbar that is capable of easily electrically connecting the plurality of battery cells.

A battery module according to an embodiment may provide a flexible busbar in which the bending region absorbs stress, and which is not readily broken even when an external shock is applied thereto.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery module, comprising:
a plurality of battery cells arranged in a line, the plurality of battery cells being adjacent to each other along a first direction; and
a busbar electrically connecting the plurality of battery cells,
wherein the busbar includes:
a large current busbar having a central region and a peripheral region,
a stepped busbar directly on and vertically overlapping the central region of the large current busbar and electrically connecting the central region of the large current busbar and the plurality of battery cells, and
a wave busbar directly on and vertically overlapping the peripheral region of the large current busbar and electrically connecting the peripheral region of the large current busbar and the plurality of battery cells,
wherein the wave busbar includes:
an inner body region on and vertically overlapping the peripheral region of the large current busbar,
an outer body region on an outer side of the inner body region, and
a bending region that connects the inner body region and the outer body region, the bending region including a rounded portion facing a region between two adjacent ones of the plurality of battery cells, and
wherein the bending region is bent from both the inner body region and the outer body region and extends downward toward the region between the two adjacent ones of the plurality of battery cells, the rounded portion of the bending region vertically overlapping a space between the two adjacent ones of the plurality of battery cells.

2. The battery module as claimed in claim 1, wherein:
a thickness of the large current busbar is greater than a thickness of the stepped busbar, and
the thickness of the large current busbar is greater than a thickness of the wave busbar.

3. The battery module as claimed in claim 1, wherein the large current busbar includes:
a rectangular plate-shaped body, and
a protrusion that protrudes outwardly from a central region of the body.

4. The battery module as claimed in claim 1, wherein:
the large current busbar includes copper or aluminum, and
the stepped busbar or the wave busbar includes aluminum.

5. The battery module as claimed in claim 1, wherein the stepped busbar includes:
a body region that is welded to the central region of the large current busbar,
at least one leg region that extends from the body region and is welded to a battery cell of the plurality of battery cells, and
a first inclined region that is downwardly inclined between the body region and the at least one leg region.

6. The battery module as claimed in claim 5, wherein a height of the first inclined region is equal to a thickness of the large current busbar.

7. The battery module as claimed in claim 5, wherein the at least one leg region includes a pair of leg regions that respectively extend from opposite ends of the body region.

8. The battery module as claimed in claim 1, wherein the wave busbar further includes:
a first leg region that extends from the inner body region and is welded to one battery cell of the plurality of battery cells;
a first inclined region that is downwardly inclined between the inner body region and the first leg region;
a second leg region that is welded to another battery cell of the plurality of battery cells; and
a second inclined region that is downwardly inclined between the outer body region and the second leg region.

9. The battery module as claimed in claim 8, wherein a height of the bending region is 2 to 5 times a thickness of the bending region.

10. The battery module as claimed in claim 8, wherein a height of the bending region is greater than a thickness of the large current busbar.

11. The battery module as claimed in claim 8, wherein the bending region has a cross-sectional shape in which a corner round part is applied to a right angle shape or a corner round part is applied to a trapezoid shape.

12. The battery module as claimed in claim 9, wherein a height of the second inclined region is equal to a thickness of the large current busbar.

13. The battery module as claimed in claim 5, wherein the at least one leg region includes a first leg region extending from the body region and a second leg region extending from the body region, the first and second leg regions extending in a second direction perpendicular to the first direction from opposite ends of the body region.

14. The battery module as claimed in claim 1, wherein, of the inner and outer body regions of the wave busbar, only the inner body region is on and vertically overlapping the large current busbar.

15. The battery module as claimed in claim 14, wherein the inner body region and the outer body region are adjacent to each other in the first direction, the bending region being between the inner body region and the outer body region in the first direction, and a longitudinal direction of the bending region extending in a second direction perpendicular to the first direction and parallel to a longitudinal direction of an adjacent one of the plurality of battery cells.

16. The battery module as claimed in claim 1, wherein the bending region extends adjacent to and along an outer lateral edge of the large current busbar.

17. The battery module as claimed in claim 16, wherein a length of the bending region overlaps a majority of a length of the outer lateral edge of the large current busbar.

18. The battery module as claimed in claim 1, wherein the bending region has a U-shaped vertical cross section, when taken along the first direction.

\* \* \* \* \*